United States Patent
Rumteen et al.

(10) Patent No.: US 8,977,113 B1
(45) Date of Patent: Mar. 10, 2015

(54) MOBILE DEVICE VIDEO DECISION TREE

(71) Applicants: Joseph Rumteen, Porter Ranch, CA (US); Zhobin Napoleon Rumteen, Woodland Hills, CA (US)

(72) Inventors: Joseph Rumteen, Porter Ranch, CA (US); Zhobin Napoleon Rumteen, Woodland Hills, CA (US)

( * ) Notice: Subject to any disclaimer, the term of this patent is extended or adjusted under 35 U.S.C. 154(b) by 0 days.

(21) Appl. No.: 14/063,863

(22) Filed: Oct. 25, 2013

(51) Int. Cl.
*A63F 13/10* (2006.01)
*H04N 9/87* (2006.01)
*A63F 13/40* (2014.01)

(52) U.S. Cl.
CPC . *H04N 9/87* (2013.01); *A63F 13/10* (2013.01)
USPC .......................................... 386/341; 463/31

(58) Field of Classification Search
CPC ......... H04N 9/8205; H04N 9/87; H04N 9/80; H04N 5/775; A63F 13/10; A63F 2300/632
USPC ......... 386/239–241, 244, 246, 248, 343, 344, 386/353; 463/31
See application file for complete search history.

(56) References Cited

U.S. PATENT DOCUMENTS

| | | | | |
|---|---|---|---|---|
| 4,305,131 | A * | 12/1981 | Best | 715/716 |
| 5,358,259 | A * | 10/1994 | Best | 463/31 |
| 5,607,356 | A * | 3/1997 | Schwartz | 463/31 |
| 5,692,212 | A * | 11/1997 | Roach | 715/239 |
| 5,809,244 | A * | 9/1998 | Asai et al. | 709/217 |
| 6,111,567 | A * | 8/2000 | Savchenko et al. | 715/202 |
| 6,229,524 | B1 * | 5/2001 | Chernock et al. | 345/157 |
| 6,289,363 | B1 * | 9/2001 | Consolatti et al. | 715/255 |
| 6,299,535 | B1 * | 10/2001 | Tanaka | 463/31 |
| 6,337,683 | B1 * | 1/2002 | Gilbert et al. | 345/418 |
| 6,982,716 | B2 * | 1/2006 | Kulas | 345/473 |
| 7,062,712 | B2 * | 6/2006 | Schneider et al. | 715/721 |
| 7,467,218 | B2 * | 12/2008 | Gould et al. | 709/231 |
| 7,713,126 | B2 * | 5/2010 | Suzuki et al. | 463/31 |
| 7,890,648 | B2 * | 2/2011 | Gould et al. | 709/231 |
| 8,082,499 | B2 * | 12/2011 | Hudson et al. | 715/702 |
| 8,176,425 | B2 * | 5/2012 | Wallace et al. | 715/721 |
| 8,425,325 | B2 | 4/2013 | Hope | |
| 8,521,709 | B2 * | 8/2013 | Gottlieb et al. | 707/705 |
| 8,600,220 | B2 * | 12/2013 | Bloch et al. | 386/296 |
| 2002/0053089 | A1 * | 5/2002 | Massey | 725/135 |
| 2002/0056136 | A1 * | 5/2002 | Wistendahl et al. | 725/135 |
| 2002/0105535 | A1 * | 8/2002 | Wallace et al. | 345/719 |
| 2003/0149983 | A1 * | 8/2003 | Markel | 725/51 |
| 2003/0222890 | A1 * | 12/2003 | Salesin et al. | 345/629 |
| 2003/0223732 | A1 * | 12/2003 | Lin et al. | 386/69 |
| 2004/0139481 | A1 * | 7/2004 | Atlas et al. | 725/135 |
| 2005/0071736 | A1 * | 3/2005 | Schneider et al. | 715/500 |
| 2006/0064733 | A1 * | 3/2006 | Norton et al. | 725/135 |
| 2008/0052750 | A1 * | 2/2008 | Grunnet-Jepsen et al. | 725/109 |
| 2010/0197326 | A1 * | 8/2010 | Ngo | 455/466 |
| 2011/0137753 | A1 * | 6/2011 | Moehrle | 705/27.1 |
| 2011/0202562 | A1 * | 8/2011 | Bloch et al. | 707/776 |
| 2012/0094768 | A1 * | 4/2012 | McCaddon et al. | 463/42 |

* cited by examiner

*Primary Examiner* — David Harvey
(74) *Attorney, Agent, or Firm* — Robert C. Klinger

(57) ABSTRACT

An example method for managing a plurality of media is provided. The method includes providing a composite media file with a plurality of scenes and a plurality of events; playing a scene of the media on a display with at least one event of the plurality of events positioned over the scene; determining if an event of the at least one event has been selected while the scene is playing; and responsive to the event being selected, taking an action.

15 Claims, 13 Drawing Sheets

US 8,977,113 B1

MOBILE DEVICE VIDEO DECISION TREE

TECHNICAL FIELD

This disclosure relates in general to the field of media and, more particularly, to a mobile device with a video decision tree.

BACKGROUND

Pick your own path books allow a reader to participate in the story by making effective choices. The narrative branches along various paths through the use of numbered paragraphs or pages. This has advanced to video on the Internet in web-based archives of potentially never ending stories linked together by hyperlinks. Traditionally, after viewing a video, a set of decisions are displayed, allowing a user to select one and move to the next video.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF THE EXAMPLE EMBODIMENTS

Summary

An example method for managing a plurality of media is provided. The method includes providing a composite media file with a plurality of scenes and a plurality of events; playing a scene of the media on a display with at least one event of the plurality of events positioned over the scene; determining if an event of the at least one event has been selected while the scene is playing; and responsive to the event being selected, taking an action.

Example EMBODIMENTS

Figure 1:
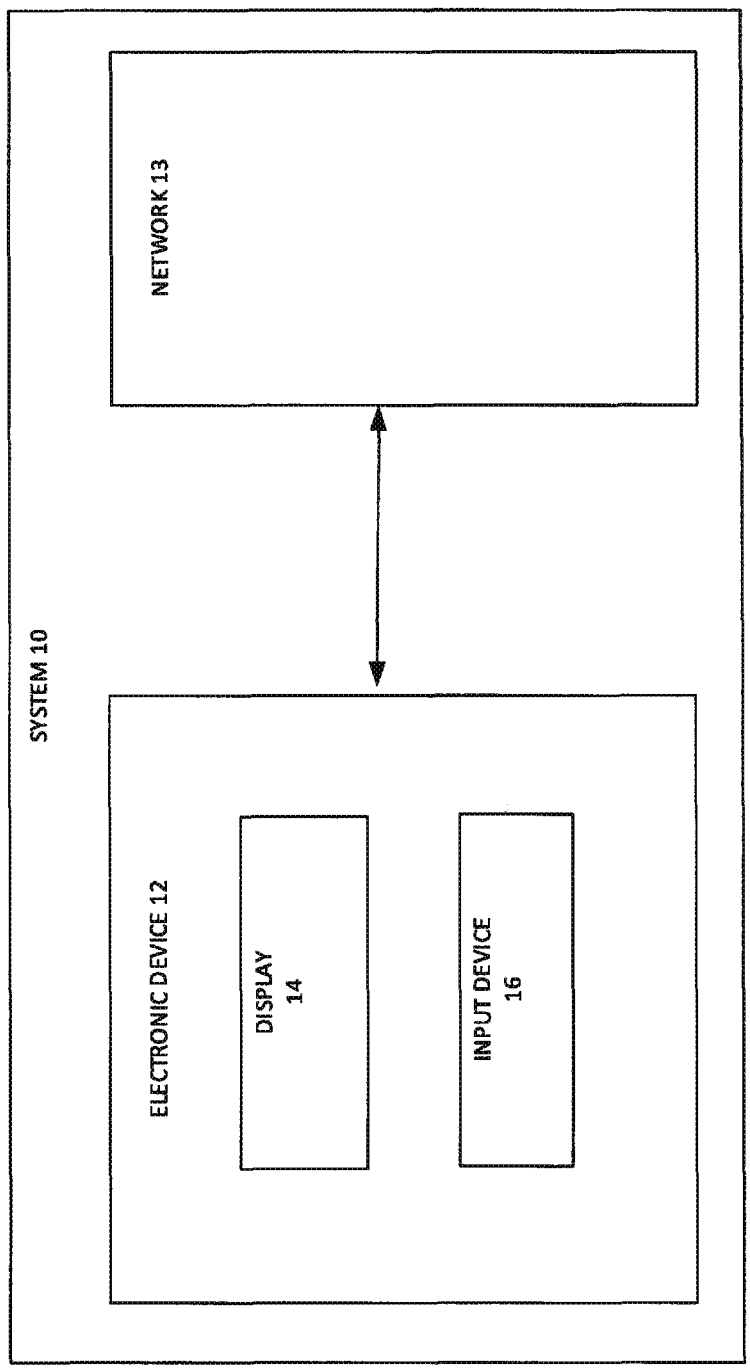
FIG. 1 depicts a system of an electronic device and a network in accordance with an embodiment of the present disclosure.

FIG. 1 depicts a system 10 of an electronic device 12 and a network 13 in accordance with an embodiment of the present disclosure. In some embodiments, electronic device 12 may be a media player for playing music and/or video, a cellular phone, a personal data organizer, or any combination thereof. Thus, electronic device 12, e.g. a portable electronic device, may be a unified device providing any one of or a combination of the functionality of a media player, a cellular phone, a personal data organizer, and so forth. In addition, electronic device 12 may allow a user to connect to and communicate through network 13, including a cellular network, local-area-network (LAN), wide-area-network (WAN), campus-area network (CAN), municipal area network (MAN) and/or the Internet. For example, the electronic device 12 may allow a user to communicate using e-mail, text messaging, instant messaging, or using other forms of electronic communication. By way of example, electronic device 12 may be a model of an iPod® having a display screen or an iPhone® available from Apple Inc. In some embodiments, electronic device 12 may be a portable videogame console, such as Nintendo DS® or Game Boy® manufactured by Nintendo, Inc., PlayStation Portable® manufactured by Sony, or any suitable portable videogame console.

Electronic device 12 may include a display 14 and an input device 16. Display 14 may be a liquid crystal display (LCD), a light emitting diode (LED) based display, an organic light emitting diode (OLED) based display, or other suitable display. In accordance with certain embodiments of the present technique, display 14 may display a user interface as well as various images, such as logos, avatars, photos, videos, album art, and so forth. Additionally, in one embodiment display 14 may be a touch screen through which a user may interact with the user interface. Display 14 may also display various function and/or system indicators to provide feedback to a user, such as power status, call status, memory status, etc. These indicators may be in incorporated into the user interface displayed on display 14.

In one embodiment, input device 16 is configured to control the electronic device 12, such as by controlling a mode of operation, an output level, an output type, etc. For instance, input device 16 may include a button to turn electronic device 12 on or off. In general, embodiments of electronic device 12 may include any number of user input structures, including buttons, switches, a control pad, keys, knobs, a scroll wheel, or any other suitable input structures. Input device 16 may work with a user interface displayed on electronic device 12 to control functions of electronic device 12 or of other devices connected to or used by the electronic device 12. For example, input device 16 may allow a user to navigate a displayed user interface or to return such a displayed user interface to a default or home screen.

Figure 2:
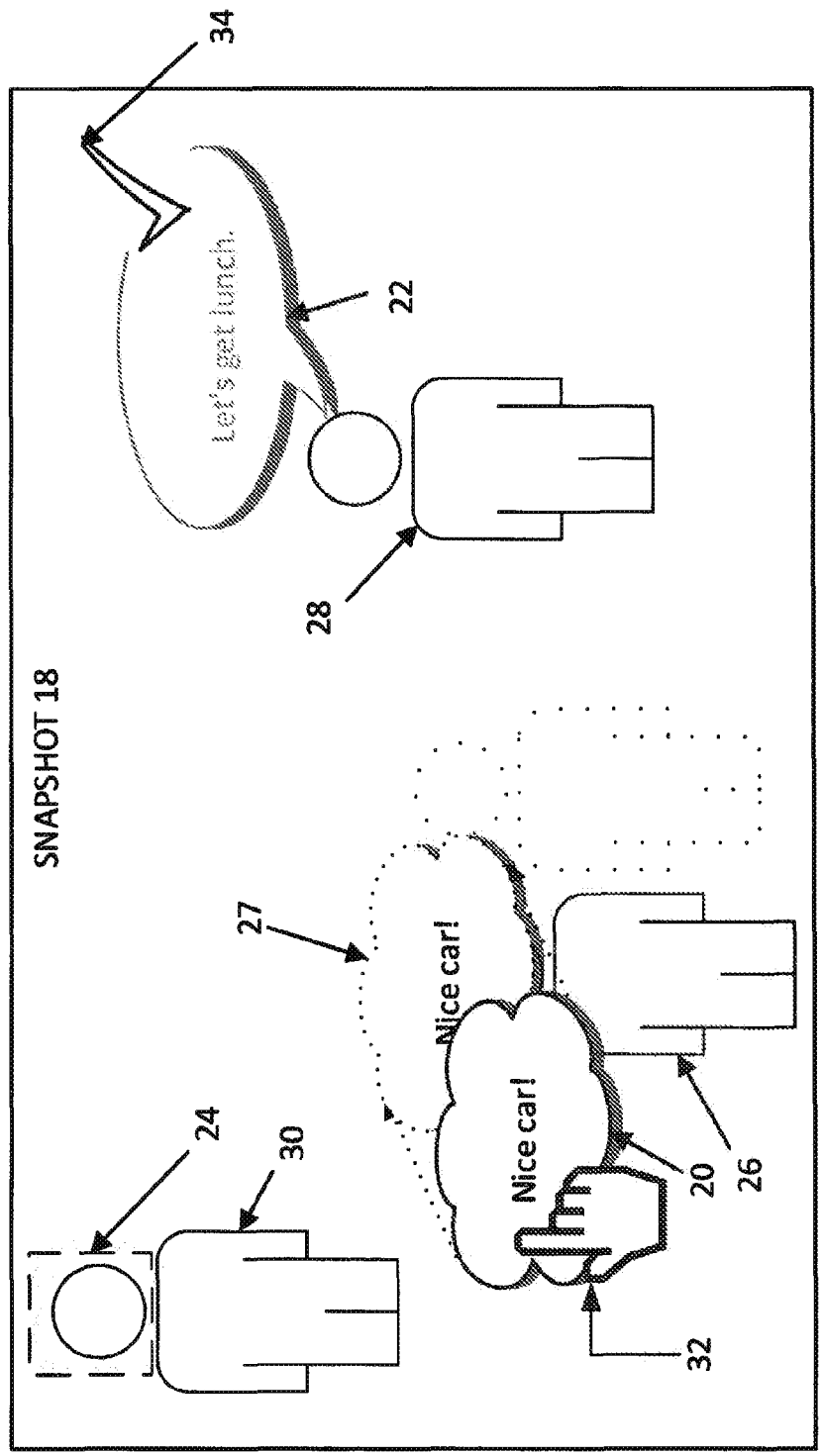
FIG. 2 is a snapshot of a scene in accordance with an embodiment of the present disclosure.

FIG. 2 is a snapshot 18 of a scene in accordance with an embodiment of the present disclosure. Snapshot 18 may be a frame of a scene that may be, for example, part of a media file within a composite media. In an embodiment, the composite media may be a storyline. In an embodiment, snapshot 18 may include decisions 20-24 and objects 26-30. The composite media may have a branching plot where one scene may move to different other scenes based on decisions 20-24 as part of a decision tree.

Decisions 20-24 may be represented by various buttons or images and overlaid on top of the scene. For example, if the scene is a video file and played on a mobile device, as an object appears on the screen that may be interacted with, a representation for a decision may be placed over the video file on a display. The objects may be any type of image that may appear in a file, such as a video file. For example, but not limited to, the objects may be people, drinks, cars, furniture, and the like. In some examples, the decision may be associated with an object, in other examples, the decision is not associated with an object. If a decision is associated with an object, the decision may be positioned near the object. Decisions 20-24 may also be referred to as events. Selecting a decision or other selectable item in the scene may be referred to as an action.

The various embodiments take into account and recognize that it is desirable to be able to select a path to a second scene from the current scene by making that selection immediately. The embodiments herein provide a system for selecting decisions as they appear because the decisions may be overlaid in front of the video that is playing. In some embodiments, the decisions may appear near an object they are associated with.

In an example embodiment, decision 20 may move to a new location 27 along with object 26. Decision 20 may be associated with object 26. In this embodiment, object 26 may have moved in the scene as indicated by the dotted lines version of object 26 and decisions 20 is moving with object 26. Cursor 26 may represent a touch from a user on a touch sensitive display, a mouse location, or the like. In this example, a selection of decision 20 may take a user to a scene to further interact with object 26 and indicate that object 26 has a "nice car".

In an example embodiment, decision 22 may be associated with object 28. In this example, decision 22 has already been visited. Image 28 may indicate that decision 22 has already been visited. In other examples, image 28 may be represented by other indicators besides a checkmark, such as a shaded version of the representation of decision 22, or a differently colored version, or the like. In this example, a selection of decision 22 may take a user to a scene to further interact with object 28 and state to object 28, "Let's get lunch."

In an example embodiment, decision 24 is associated with object 30. In decision 20 and 22, there are phrases that are indicated to be played if a user selects those decisions. Decision 24 is a box around the head of object 30, which is a person. In this example, a selection of decision 24 may take a user to a scene to further interact with object 30.

In other embodiments, there may be more or less objects and decisions. Additionally, not every object is associated with a decision and not every decision is associated with an object.

The video playback experience provides a mixture of video, audio, voice and decisions that can be blended to provide an interactive interface for a user to navigate decisions within a video playback experience on a touch screen device. In one or more embodiments, a user may navigate decision using their own voice. In this example, the voice may be recognized using a voice recognition program and then compared to the available decisions to select a decision.

Figure 3:
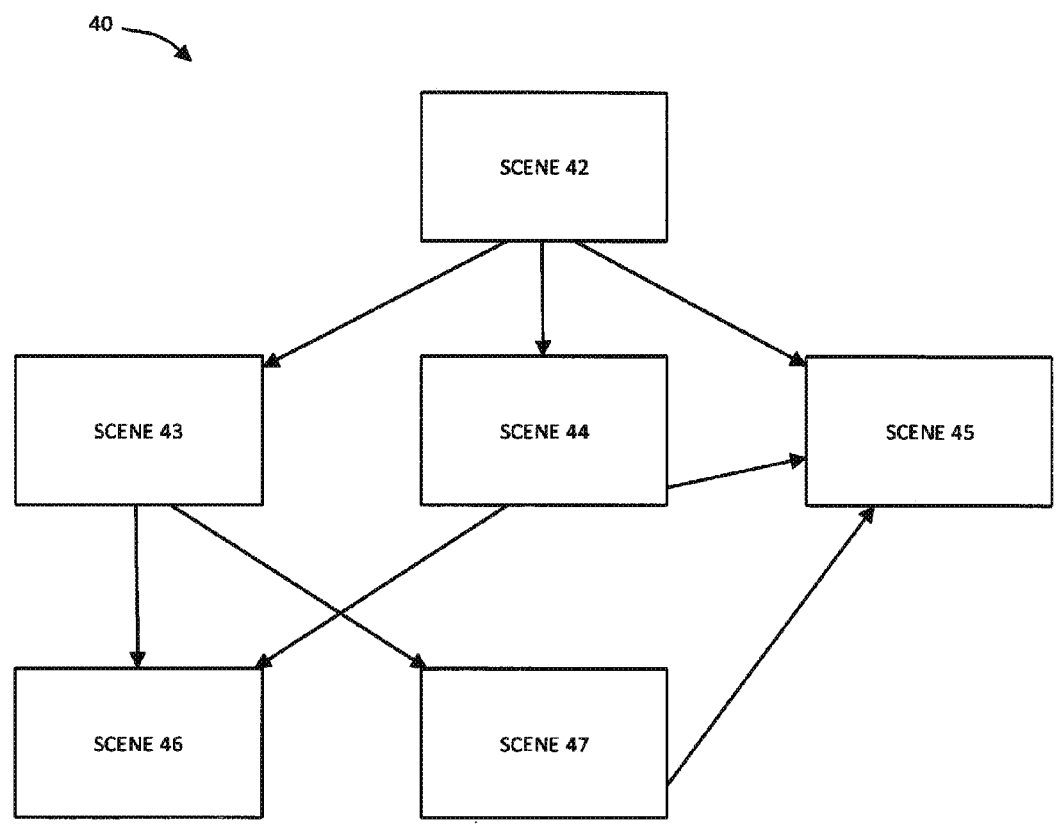
FIG. 3 is a decision tree in accordance with an embodiment of the present disclosure.

FIG. 3 is a decision tree 40 in accordance with an embodiment of the present disclosure. Decision tree 40 is may be a tree-like graph or model of decisions and their possible consequences. It is one way to display an algorithm. A group of videos and decisions can be arranged in complex navigation scheme to provide a rich, interactive flow within a touch screen device.

Decision tree 40 includes scenes 42-47 and links between scenes 42-47. Each scene in a composite media may have one or more decisions. Those decisions may dictate which scene is played next.

For example, in an embodiment, scene 44 may have two decisions. The first decision may lead to scene 46 while the second decision may lead to scene 45. Alternatively, in another embodiment, scene 44 may have only a single decision. This decision may lead to scene 46, while the absence of a decision being selected may lead to scene 45.

In FIG. 3, scene 45 does not have a link that leads from it. In this example, scene 45 may be a final scene in this embodiment. In some embodiments, the scenes may be separated into groups on a timeline. The timeline may be a story timeline or series timeline. The timeline may represent a path of the scenes. The groups may represent different portions of the timeline, for example, but not limited to, a beginning, middle, and end. In an example, if a user is about to enter the next group but has not visited all the scenes form the current group, the video playback engine may bring the user back to one of the unvisited scenes from the current group. The different embodiments in this disclosure recognize that a user may navigate to a next group while missing some important elements from the scenes in the current group. In yet a further example, the video playback engine may only bring the user to those scenes that are unvisited and also flagged as important in the current group. The scenes may be flagged important based on a whether they contain important story elements, whether they contain items that the video playback engine determine that the user may enjoy based on a use profile, or the like. The visited and unvisited scenes may also be referred to as played and non-played scenes, respectively.

Figure 4:
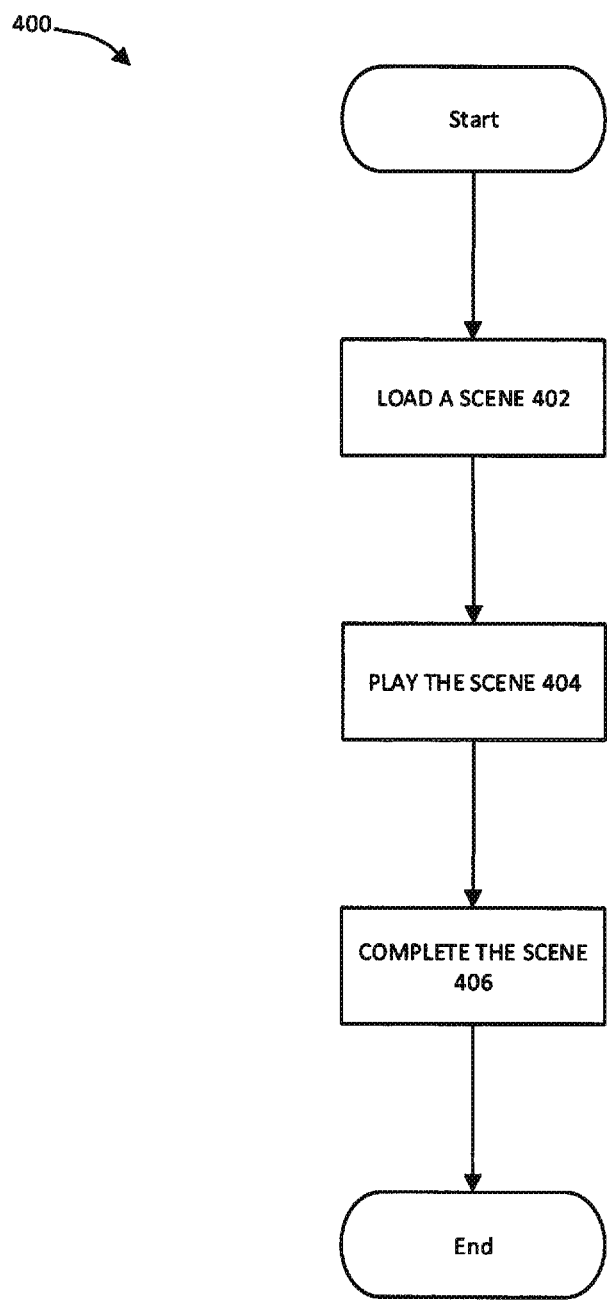
FIG. 4 is a flowchart for managing a scene in accordance with an embodiment of the present disclosure.

FIG. 4 is a flowchart for managing a scene in accordance with an embodiment of the present disclosure. The elements in FIG. 4 may be executed and operated in a variety of systems, for example, but not limited to, system 10 as shown in FIG. 1. A video playback engine may be configured to play each scene of a media (a combination of video, audio, user voice, and decisions (buttons)).

At 402, the video playback engine loads a scene. A load scene module may load the scene. The scene may be a media file with both audio and video components. The scene may be loaded using a configuration file. The load scene module may be a sub-module of the video playback engine that defines the overall flow of how to load a scene configuration file to combine video, audio, and user voice into a scene (movie composite) that is ready to be played.

At 404, the video playback engine plays the scene. A play scene module may play the scene. The play scene module may be a sub-module of the video playback engine that defines the overall flow of how to play back a scene to provide a robust and interactive experience to a user. This playback may contain video, audio, user voice, and interactive decisions (buttons) throughout the experience. During the playback of a scene various decisions (buttons) may be presented where the user can touch on a touch screen device to proceed to play a different scene (to connect a scene to another scene).

At 406, the video playback engine completes the scene. A complete scene module may complete the scene. The complete scene module may be a sub-module of the video playback engine that defines what may be performed and occur at the end of the playback of a scene. In an example embodiment, the complete scene module may rewind and start a playback of the current scene.

Figure 5:
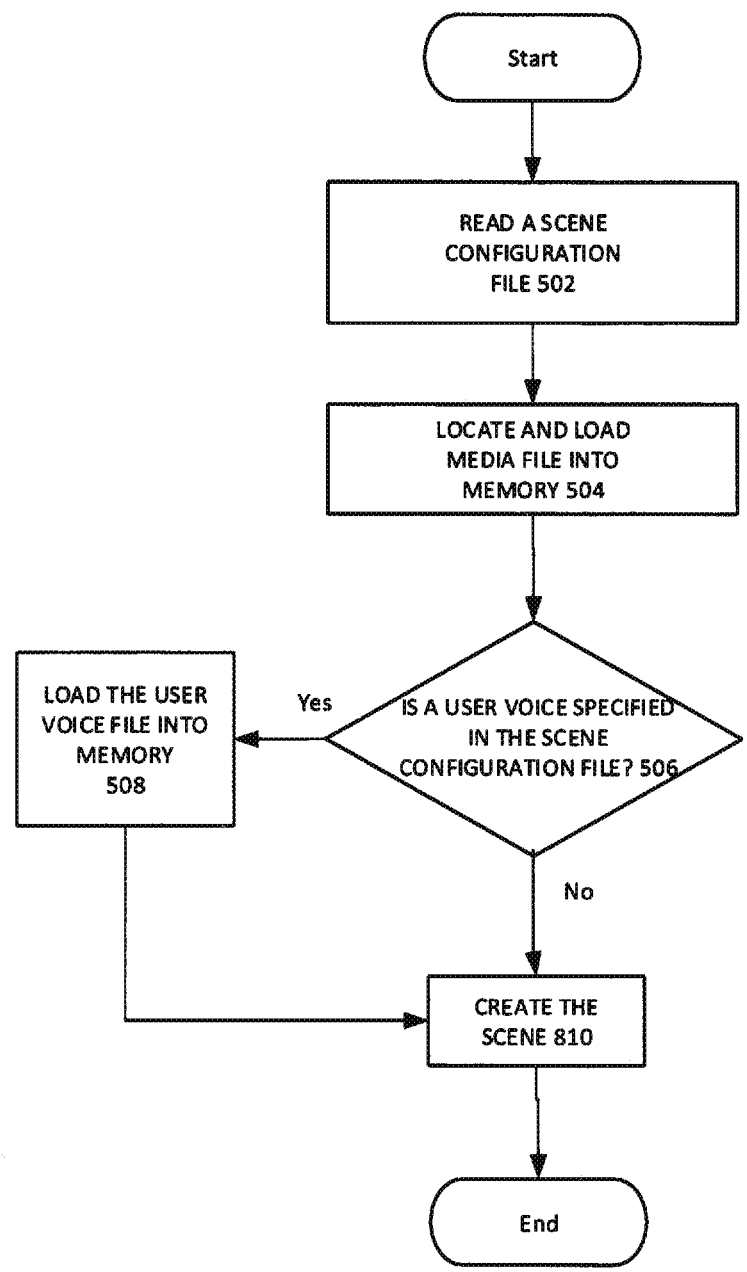
FIG. 5 is a flowchart for loading a scene in accordance with an embodiment of the present disclosure.

FIG. 5 is a flowchart for loading a scene in accordance with an embodiment of the present disclosure. The elements in FIG. 5 may be executed and operated in a variety of systems, for example, but not limited to, system 10 as shown in FIG. 1. In an embodiment, a load scene module defines the overall flow of how to load a scene configuration file to combine video, audio, and user voice into a scene (movie composite) that is ready to be played.

At 502, the load scene module may read a scene configuration file. In an embodiment, as part of loading a scene, the first step may be to load a scene configuration file from a file in the bundle of the application code on a touch screen device. The name of the scene configuration file may be given and the file may be parsed and stored in the memory of the application for further software components to utilize.

After the scene configuration file is read, at 504, the load scene module may locate and load a media file into memory. This media file may contain both a video and audio track for the main playback experience of the scene. This movie is buffered into memory by operating system.

After the movie is read, at 506, the load scene module may determine if a user voice is specified in the scene configuration file. Using the user voice filename specified in the scene configuration file, the load scene module may buffer the audio file, such as a way, mp3, aac, or the like, into memory to be available to add to the playback of the scene. In one embodiment, the user voice is a prerecorded set of phrases that may be used to mimic a user speaking in the scene. In another embodiment, the user may have created its own user voice file previously, which is loaded, and as the user makes selections of decisions, the user's voice is used as the user voice. Additionally, the user may speak into a microphone during a scene to make selections of decisions. The electronic device may recognize the speech of the user and perform the selection of the user without a manual selection.

If there is a user voice specified, at 508, the load scene module may load the user voice file into memory. Otherwise, at 510, the load scene module may continue to create the scene. The load scene module may create a scene that includes the movie, containing video and audio components, and the optional user voice audio file. In an example embodiment, the video and audio components may be inserted at time 0 in the scene.

Some of the flags, offsets, and variables included in the scene configuration file may include, but not limited to:

video=File name of a video file that includes both a video and audio track to be included in a scene playback;

voice=File name of an audio file that is to be included in a scene playback to mimic the player voice in the experience;

end-values-offset=An offset in the video timeline of when the end occurs from a score perspective;

start-values=An arbitrary dictionary of values that will be added to the score at the start of the playback of a scene;

end-values=An arbitrary dictionary of values that will be added to the score at the end of the playback of a scene;

decisions=An array of dictionaries that define the decisions to be included in a scene playback to provide a set of buttons to a user to navigate to a subsequent scene;

loop-offset=A number that defines where the scene should be rewound and replayed at the completion of a scene;

back=A boolean flag that determines whether the navigation should "pop" back one scene at the completion of a scene;

stump=A dictionary that defines a set of choices to be displayed at the completion of a scene.

Figure 6:
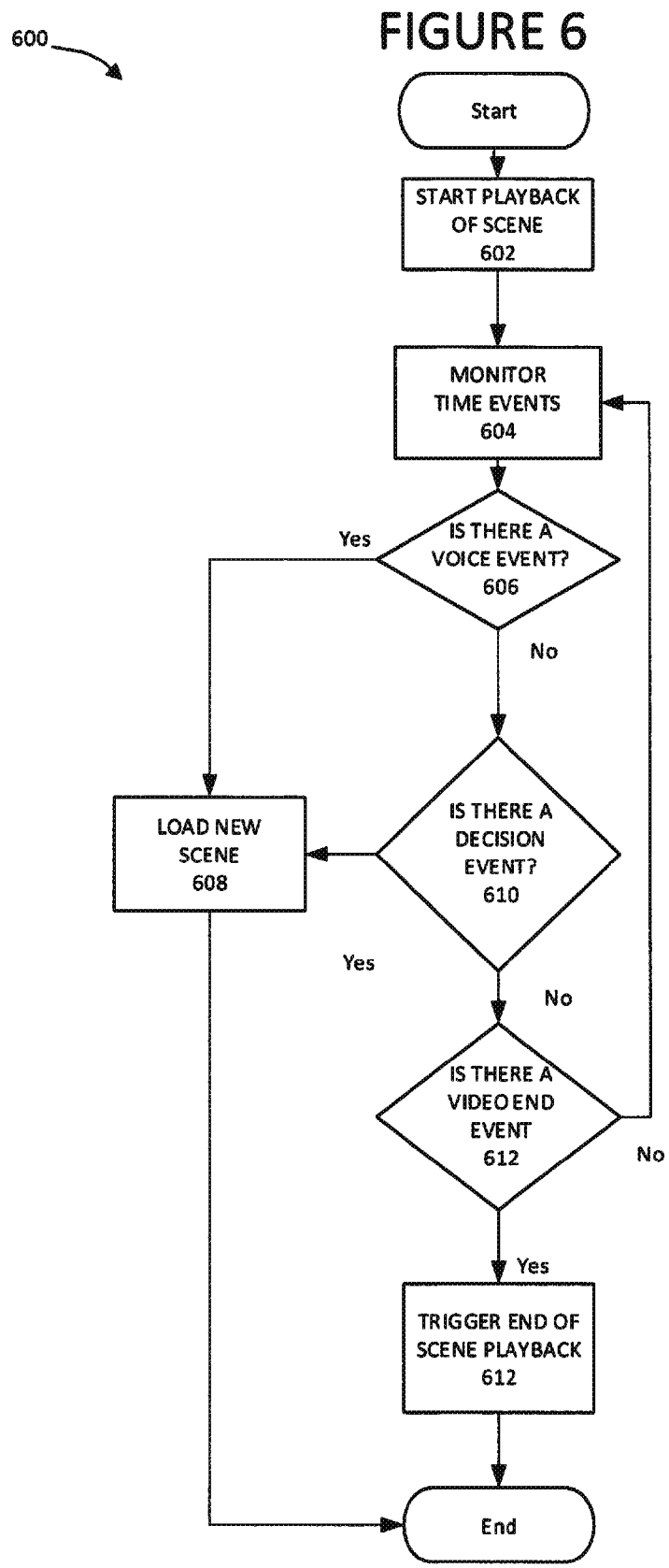
FIG. 6 is a flowchart for playing a scene in accordance with an embodiment of the present disclosure.

FIG. 6 is a flowchart for playing a scene in accordance with an embodiment of the present disclosure. The elements in FIG. 6 may be executed and operated in a variety of systems, for example, but not limited to, system 10 as shown in FIG. 1. In an embodiment, a play scene module defines the overall flow of how to play back a scene to provide a robust and interactive experience to a user. This playback may contain video, audio, user voice, and interactive decisions (buttons) throughout the experience. During the playback of a scene various decisions (buttons) may be presented where the user can touch on a touch screen device to proceed to play a different scene (to connect a scene to another scene).

In an embodiment, at 602, a play scene module may start the playback of the scene. The scene may be the previously created scene as shown in FIG. 5. In an example embodiment, the playback may be performed on a touch screen using the operating system video component. Additionally, the play scene module may register a playback event handler to be invoked periodically during the playback time (e.g., every 100 ms), register a playback ended event handler to occur at the end of the video playback, and register a decision button event handler for any buttons as they are prepared to appear on screen.

At 604, a playback timed event handler may be loaded and monitor time events. The playback time event handler may be a sub-module that handles the video timed event delivered by the video component of the operating system. This handles the complex logic of determining if the video began, ended, or has any decisions (buttons) to present, hide or move. Time events may also be an action that could occur at multiple points during a scene. For example, a time event may be "taking a drink".

At 606, a voice event handler may be loaded and determine if there is a voice event. A voice listener may be attached to the video playback. When voice is detected the decoded text is compared to a list of the visual decisions on the screen and if it matches the keywords of any decisions it may activate that decision as if the user touched the button manually.

If there is a voice event that triggers a decision, at 608, the play scene module may initiate a new scene to load. The new scene may be the scene that the decision points towards. For example, if a decision asked whether a user would like to "go outside", and the user says "yes", then the decision may be flagged as a "yes" and the load scene module may load the scene in the decision tree to which a flag of "yes" for that decision indicates. The new scene may then be a video depicting the outside.

At 610, a decision button event handler may be loaded and determine if there is a decision event. When a decision event (button event) is delivered by the operating system may determine which decision is pressed by inspecting the decision name associated with the button that was touched. This decision name is then used to start a new, independent playback of the target scene file name defined in the decision.

If there is a decision event that triggers a decision, at 608, the play scene module may initiate a new scene to load. For example, there may be two decision events. One event may be a question whether to "move outside" and the second decision may be to "say hello". If the "move outside" decision is selected, the operating system may identify that decision by name and then load the scene in the decision tree to which a flag for that decision indicates. The new scene may then be a video depicting the outside.

If there is not a decision event, then at 612, the play scene module may determine if there is a video end event. When a video end event is delivered by the video component, then at 614, the play scene module may trigger the end of the scene playback.

Figure 7:
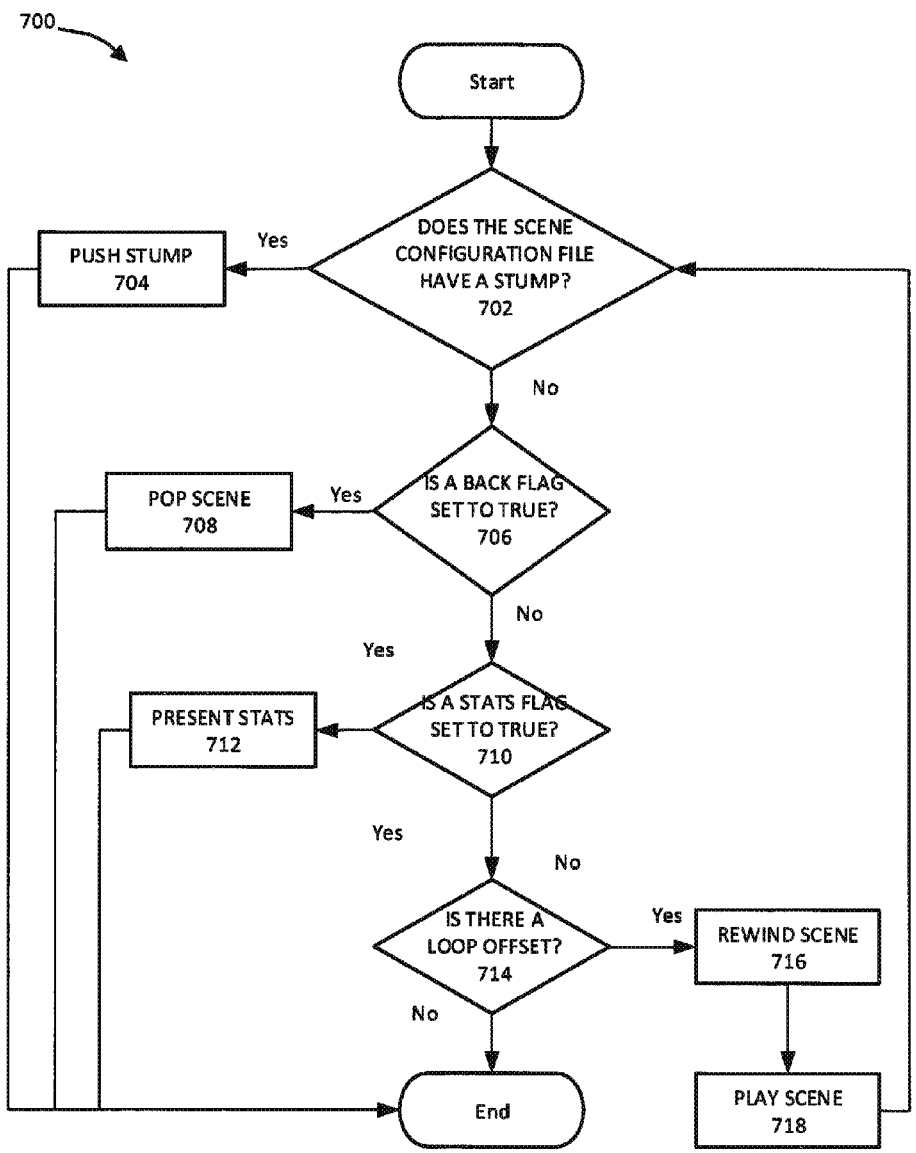
FIG. 7 is a flowchart for completing a scene in accordance with an embodiment of the present disclosure.

FIG. 7 is a flowchart for completing a scene in accordance with an embodiment of the present disclosure. The elements in FIG. 7 may be executed and operated in a variety of systems, for example, but not limited to, system 10 as shown in FIG. 1. In an embodiment, a complete scene module may complete the scene. The complete scene module may be a sub-module of the video playback engine that defines what may be performed and occur at the end of the playback of a scene. In an example embodiment, the complete scene module may rewind and start a playback of the current scene.

At 702, the complete scene module may determine if a scene configuration file has a stump. In an embodiment, the first thing that occurs at the end of a completed scene is to determine if the scene configuration file has a stump. A stump is a configuration for a set of alternate scenes that can be presented to a user. The scene configuration is inspected for a stump configuration contained in a dictionary.

If the scene configuration file has a stump, then at 704, the complete scene module may push the stump onto an operating system navigation stack. In an embodiment, a stump dictionary was detected in the scene configuration file. The complete scene module may load the stump screen and push it on to the operating system navigation stack.

If the scene configuration file does not have the stump, then at 706, the complete scene module may determine if the scene configuration file has a back flag set to true. If so, continue to place navigate back, and if not continue to check additional flags.

If the scene configuration file has a back flag set to true, then at 708, the complete scene module may pop the current scene from the operating system navigation stack.

If the scene configuration file does not have a back flag set to true, then at 710, the complete scene module may determine if the scene configuration file has the stats flag set to true. If the scene configuration file has the stats flag set to true, at 712, the complete scene module may continue to present the stats. In an embodiment, if a stats flag was detected, the module may load and push the stats view onto the operating system navigation stack.

If the scene configuration file does not have the stats flag set to true, then at 714, the complete scene module may determine if a loop-offset is specified in the scene configuration file. If so, the complete scene module may rewind the scene, and if not, the complete scene module may exit from the playback of the scene.

In an embodiment, a loop-offset is specified and should be used to rewind the movie from the beginning of the movie timeline. Once the movie is rewound the playback should be resumed and appropriate video components should remain registered.

In different embodiments, the elements of FIG. 7 may appear in a different order and/or operate simultaneously.

Figure 8:
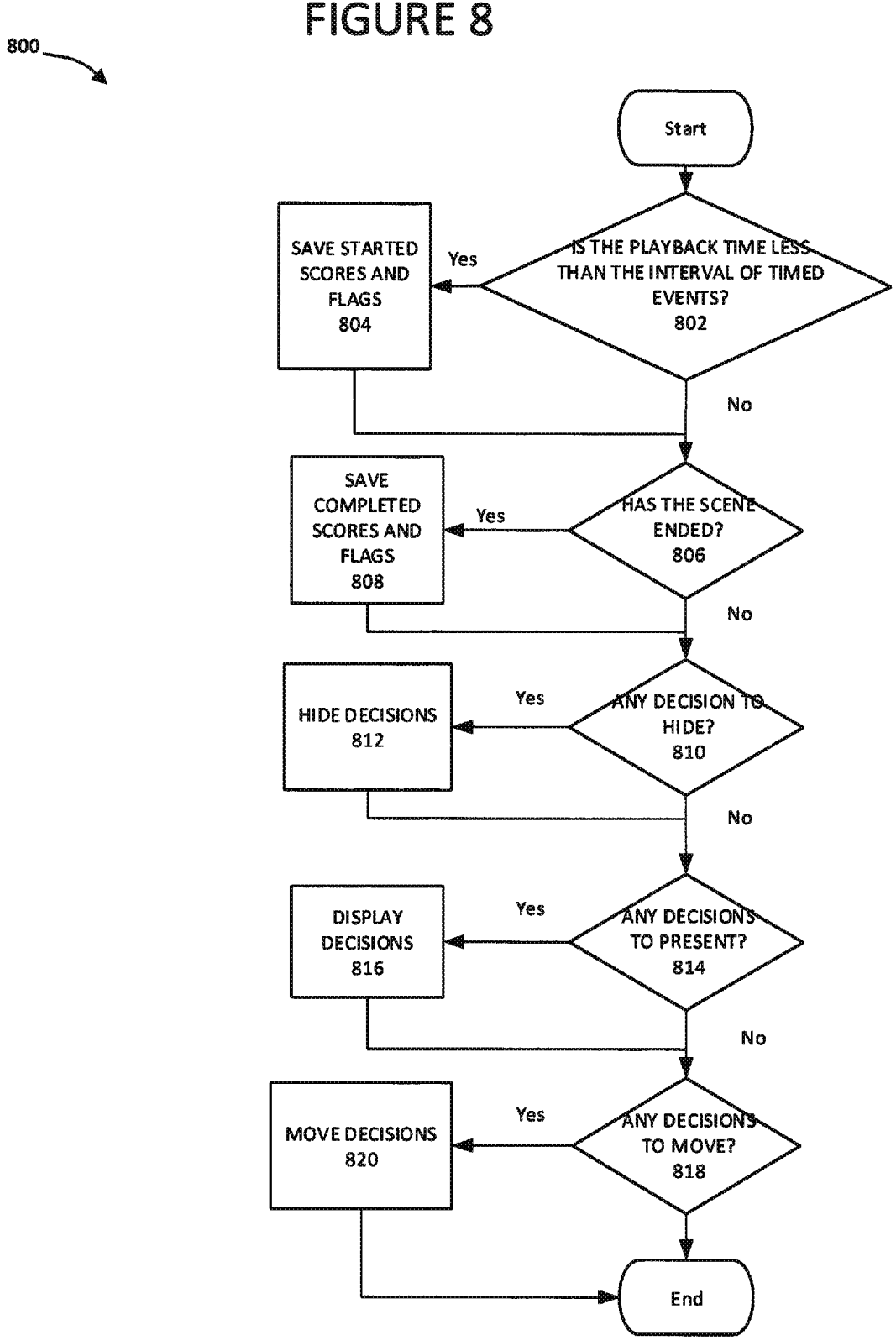
FIG. 8 is a flowchart for managing time events in accordance with an embodiment of the present disclosure.

FIG. 8 is a flowchart for managing time events in accordance with an embodiment of the present disclosure. The elements in FIG. 8 may be executed and operated in a variety of systems, for example, but not limited to, system 10 as shown in FIG. 1. In an embodiment, a playback time event handler module may manage time events.

In an embodiment, at 802, the playback time event handler module may determine if the playback time is less than the interval of the timed events. Based on the video playback event given by the operating system determine if the playback time is less than the interval of the timed events.

If yes, the playback time event handler module may, at 804, the handler module may save the started scores and flags. When starting a video, the handler module may flag the current scene as started and save to a persistent location like disk. In an embodiment, for the first time a scene is started, the handler module may sum all of the start values in the scene configuration file and store these to disk as well.

If no, the handler module, at 806, may determine if the scene has ended. The scene configuration file contains an end-values-offset that should be used to determine if the scene has ended. Consider it ended if the time exceeds the end-values-offset.

If yes, the handler module, at 808, may save the completed scores and flags. When ending a video, flag the current scene as completed and save to a persistent location like disk. In an embodiment, for the first time a scene is completed, sum all of the end values in the scene configuration file and store these to disk as well.

If no, the handler module, at 810, may determine if there are any decisions to hide by reading the decisions from the scene configuration file. A decision should be hidden if the time of the playback event is not between the offset and offset plus duration times and if the buttons for a decision are displayed in the user interface.

If yes, the handler module, at 812, may hide the decisions. In an embodiment, the handler module may gradually hide the title button, background button, and visited image for any decisions that need to be hid from the user interface. The handler module may use a mechanism of the operating system to hide these buttons from the screen.

If no, the handler module may, at 814, determine if there are any decisions to present by reading the decisions from the scene configuration file. A decision should be presented if the time of the playback event is between the offset and offset plus duration times, and if the buttons for a decision are no already displayed in the user interface.

If yes, the handler module, at 816, displays the decisions. In an embodiment, a sub-module handles the complexity of adding a decision to the screen.

If no, the handler module, at 818, may determine if there are any decisions to move by reading the decisions from the scene configuration file. The decisions may be represented by various types of images or buttons. For example, in one embodiment, there may be a speech cloud. In another embodiment, there may be a graphic of a drink to consume. In yet another embodiment, there may be a dotted box around a person or a person's head that may allow a user to communicate with that person. These images and buttons may be clickable and/or selectable.

The position of the decisions (buttons) at a specific point in the playback should be interpolated between the start-frame and end-frame proportionally based on the progression of playback relative to the duration the decision should be displayed. If any decisions are not at the location specified, they should be flagged to be moved.

If yes, the handler module, at 820, may move any identified decisions by animating the position and size of the title and background buttons as well as the visited image. An operating system specific animation technique may be used.

In different embodiments, the elements of FIG. 8 may appear in a different order and/or operate simultaneously.

Some of the flags, offsets, and variables included in the decision configuration file may include, but not limited to:

offset=A number that defines where the scene should be rewound and replayed at the completion of a scene;

duration=The duration for how long the decision will appear on the screen;

title-key=The identifier for the text from the localized bundle to be displayed as a button on the screen;

title-color=The color of the text to be displayed as a button the screen;

title-highlighted-color=The color of the text to be displayed as a button when the finger is depressed on the button;

title-shadow-color=The color of the shadow of the text to be displayed as a button on the screen;

visited-title-highlightedcolor=The color of the text to be displayed as a button when the finger is depressed on the button when the target scene was already started;

visited-title-shadow-color=The color of the shadow of the text to be displayed as a button on the screen when the target scene was already started;

start-frame=The frame (x/y origin, height/width size) of where the title button should be displayed on screen at the time of the offset;

end-frame=The frame (x/y origin, height/width size) of where the title button should be displayed on screen at the time of the offset plus the duration;

font=The name of the font to be used for the title;

font-size=The point size of the font to be used for the title;

background-image=The name of the image to be placed in a button behind the title button;

start-background-frame=The frame (x/y origin, height/width size) of where the background button should be displayed on screen at the time of the offset;

end-background-frame=The frame (x/y origin, height/width size) of where the title background button should be displayed on screen at the time of the offset plus the duration;

scene=The target scene that the should be pushed onto the operation stack when the decisions is selected (or button is pressed);

visited-image=The name of the image to be placed if the target scene is started.

start-visited-frame=The frame (x/y origin, height/width size) of where the visited image should be displayed on screen at the time of the offset; and end-visited-frame=The frame (x/y origin, height/width size) of where the visited image should be displayed on screen at the time of the offset plus the duration.

Figure 9:
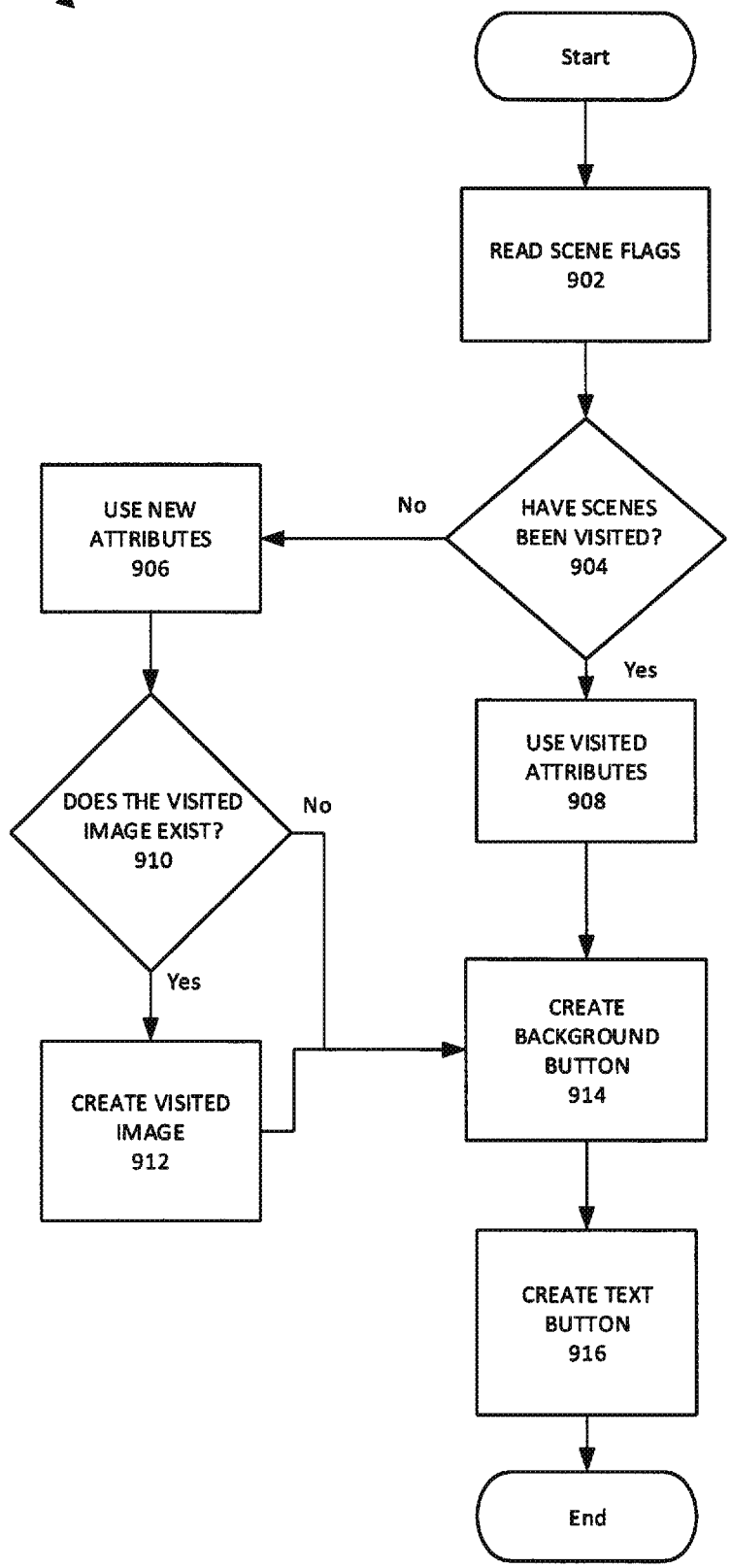
FIG. 9 is a flowchart for managing display decisions in accordance with an embodiment of the present disclosure.

FIG. 9 is a flowchart for managing display decisions in accordance with an embodiment of the present disclosure. The elements in FIG. 9 may be executed and operated in a variety of systems, for example, but not limited to, system 10 as shown in FIG. 1. In an embodiment, a display decisions module may manage display decisions.

In an embodiment, at 902, the module may read scene flags. The scene flags may be for each scene that could be visited by selecting any of the decisions in the current scene. In an embodiment, the first step is to read all the scene flags from the disk for each of the decisions to display.

At 904, the module may use these scene flags to identify if the target scene for the decision has been visited. If the any of the target scenes have been visited, the module, at 906, may use the visited attributes when configuring those decisions for display. The visited attributes may be a different color for the decision button, a check mark, or some other identifier. The module may read the visited attributes for the decision from the decisions node in the scene configuration file. This would load properties like the visited title, visited background image, visited title colors, and a visited image.

If the scenes have not been visited, the module, at 906, may use the new attributes. The module may read the new attributes for the decision from the decisions in the scene configuration file. This would load properties like the title, background image and title colors.

After 906, the module may, at 910, determine if the visited image name was retrieved from the scene configuration file and if the image actually exists. If yes, the module, at 912, creates the image. The module may load the image and an image object to be placed into the display from a disk to emphasize that the destination of the decision has been completed already.

After 908, 910, or 912, the module, at 914, may create a background button. In an embodiment, the module may use the retrieved attributes to load the background image from a disk and load it into a button that can be added and positioned on the display.

After 914, the module may, at 916, create a text button. The module may use the retrieved attributes to load the title and colors into a decision button that can be added and positioned on the display.

Figure 10:
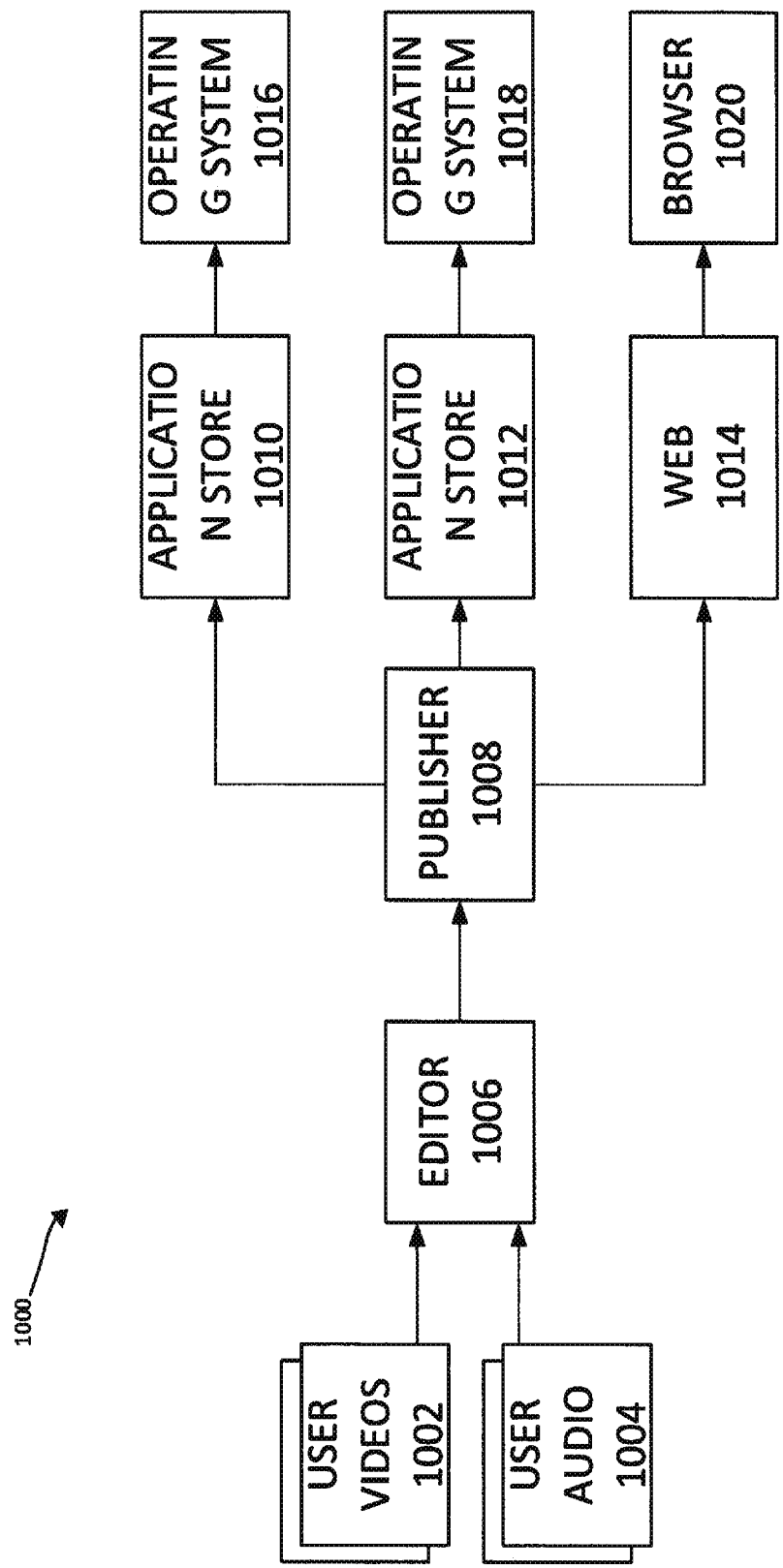
FIG. 10 is a block diagram for publishing a composite media file in accordance with an embodiment of the present disclosure.

FIG. 10 is a block diagram for publishing a composite media file in accordance with an embodiment of the present disclosure. The elements in FIG. 10 may be executed and operated in a variety of systems, for example, but not limited to, system 10 as shown in FIG. 1. In an embodiment, a publishing platform 1000 may manage publishing the composite media file.

The publishing platform 1000 may include user videos 1002 and user audio 1004 loaded into editor 1004 and a publisher 1008 to publish to application store 1010, application store 1012, and web 1014.

A rich environment is provided to support the video editing and publishing of applications built on publishing platform 1000 to various different mobile stores and devices. A user may interact and assemble their user created videos and user created audio within the editor 1006. Once the navigation, flow, and decisions are configured editor 1006 exports this to an intermediate configuration format that is loaded into publisher 1008. Publisher 1008 may be any type of publishing environment. Publisher 1008 then compiles, builds, and uploads the code to the respective application stores (e.g., application stores 1010 and 1012) on behalf of the user. Each application store 1010 and 1012 has a specific operating system 1016 and 1018 that it utilizes. Additionally, publishing to web 1014 may be performed through a specific browser 1020.

Figure 11:
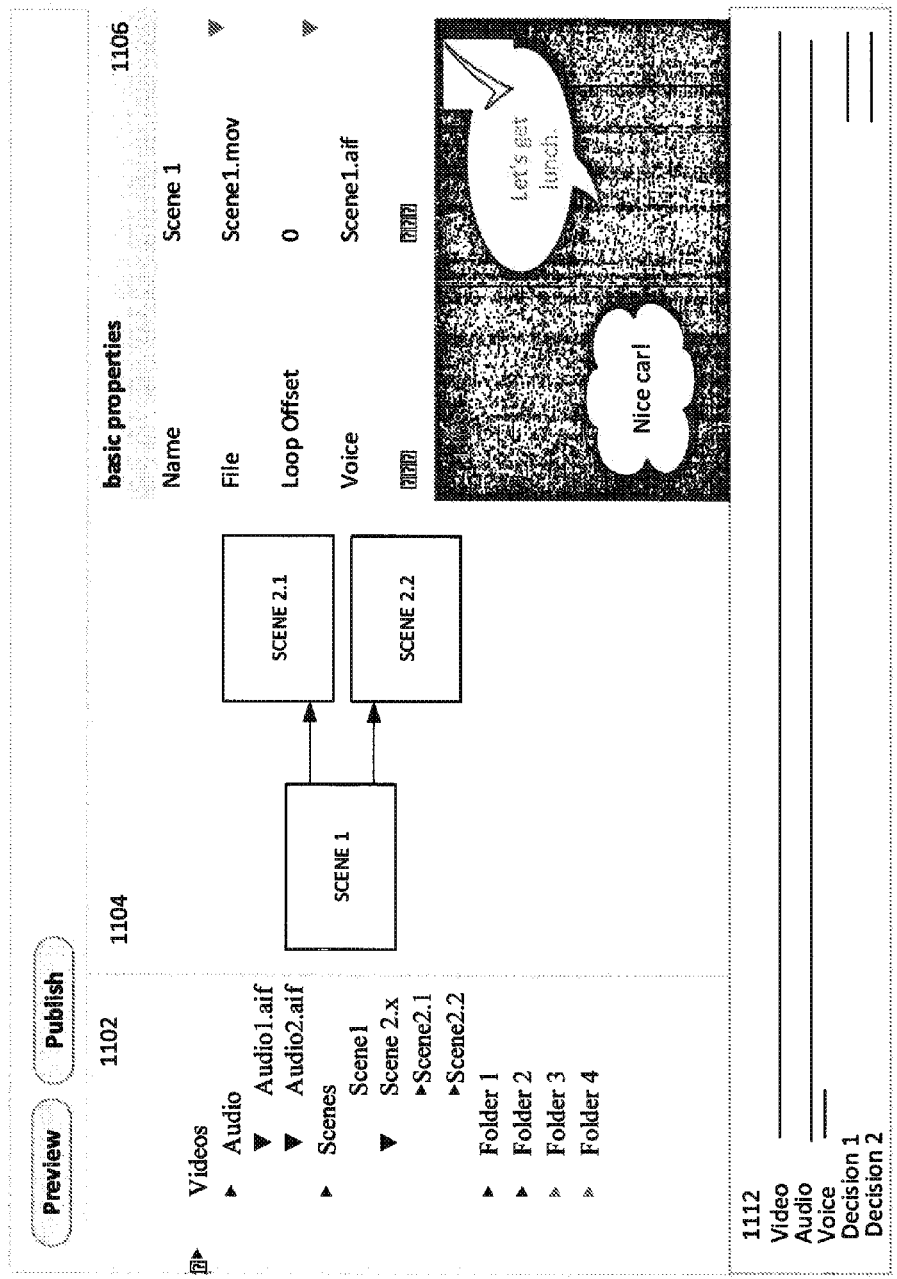
FIG. 11 is a block diagram of an editor in accordance with an embodiment of the present disclosure.

FIG. 11 is a block diagram of an editor 1006 in accordance with an embodiment of the present disclosure. The elements in FIG. 11 may be executed and operated in a variety of systems, for example, but not limited to, system 10 as shown in FIG. 1. In an embodiment, editor 1006 may manage publishing the composite media file.

In an embodiment, editor 1006 may provide an environment that allows the user to import and manage user created videos and audio in panel 1102 and arrange these into scenes in panel 1104 that is a combination of this video, audio, flow, and decisions.

Editor 1006 may provide a way to configure the properties defined in this disclosure using panel 1106 to configure which video, audio, loop offsets, etc. are present for the scene. Panel 1106 then stores this information into the corresponding configuration files in panel 1102 using any desirable format. One such format has been listed in this disclosure.

Editor 1006 may additionally show a preview of the creation in pane 1108 and allows the user to drag the position within the timeline in panel 1112 to add decisions from a palette of choices onto the video in panel 1108. The user can hide and display different decisions and content by dragging their mouse across the timeline in panel 1112. The user can also click on panel 1108 to cause the composite media to play.

In an embodiment, a user can edit configure properties for a decision by selecting them in the video where the content of panel 1106 would change to contain the items to be configured for a specific decision outlined herein and stored in the scene configuration file. The user can press the Preview button to see the created experience within the Video Decision Engine as it would appear on a mobile device.

In an embodiment, a user can press the publish button where all of the scene configurations, videos, audio outlined in panel 1102 would be loaded into a publishing server to publish to specific mobile environments.

In an embodiment, the publisher may take the audio, video and configuration from the editor, perform a series of checks and tests verify the validity of the configuration. If the configuration is valid it may combine the user created assets, configuration with the Video Decision Engine and prepare the source code and project necessary to build under each of the supported development tools (Apple, Google, Web).

In an embodiment, the publisher will compile each of these builds, upload and publish them to the respective application stores. In this example, the user may publish composite videos directly to a application store, such as a mobile device application store. From within these app stores an end consumer can download and purchase this content and use it on their mobile device. In another embodiment, the publisher may send the complied results to another entity, such as Zhoob Inc., and then that entity will publish the resulting composite video on an application store.

Figure 12:
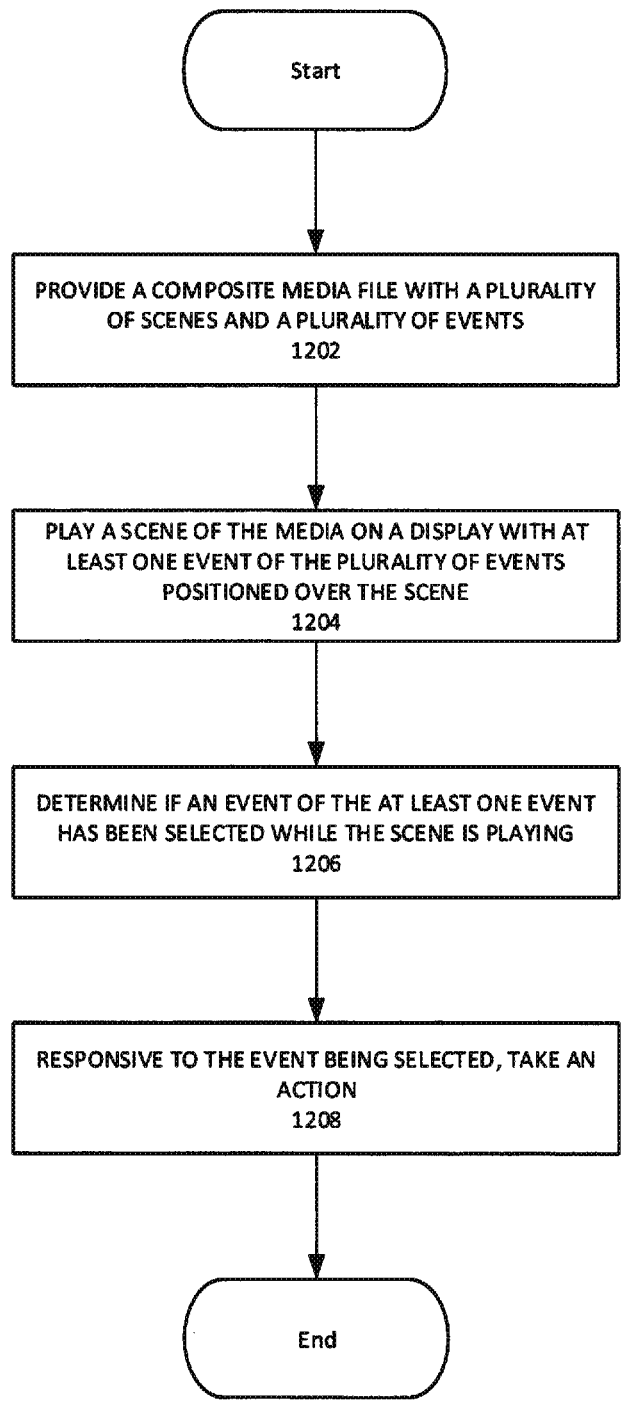
FIG. 12 is a flowchart for managing a scene in accordance with an embodiment of the present disclosure.

FIG. 12 is a flowchart for managing a scene in accordance with an embodiment of the present disclosure. The elements in FIG. 12 may be executed and operated in a variety of systems, for example, but not limited to, system 10 as shown in FIG. 1.

In an embodiment, at 1202, an apparatus may provide a composite media file with a plurality of scenes and a plurality of events. At 1204, the apparatus may play a scene of the media on a display with at least one event of the plurality of events positioned over the scene. At 1206, the apparatus may determine if an event of the at least one event has been selected while the scene is playing. At 1208, the apparatus may take an action in response to the event being selected.

Figure 13:
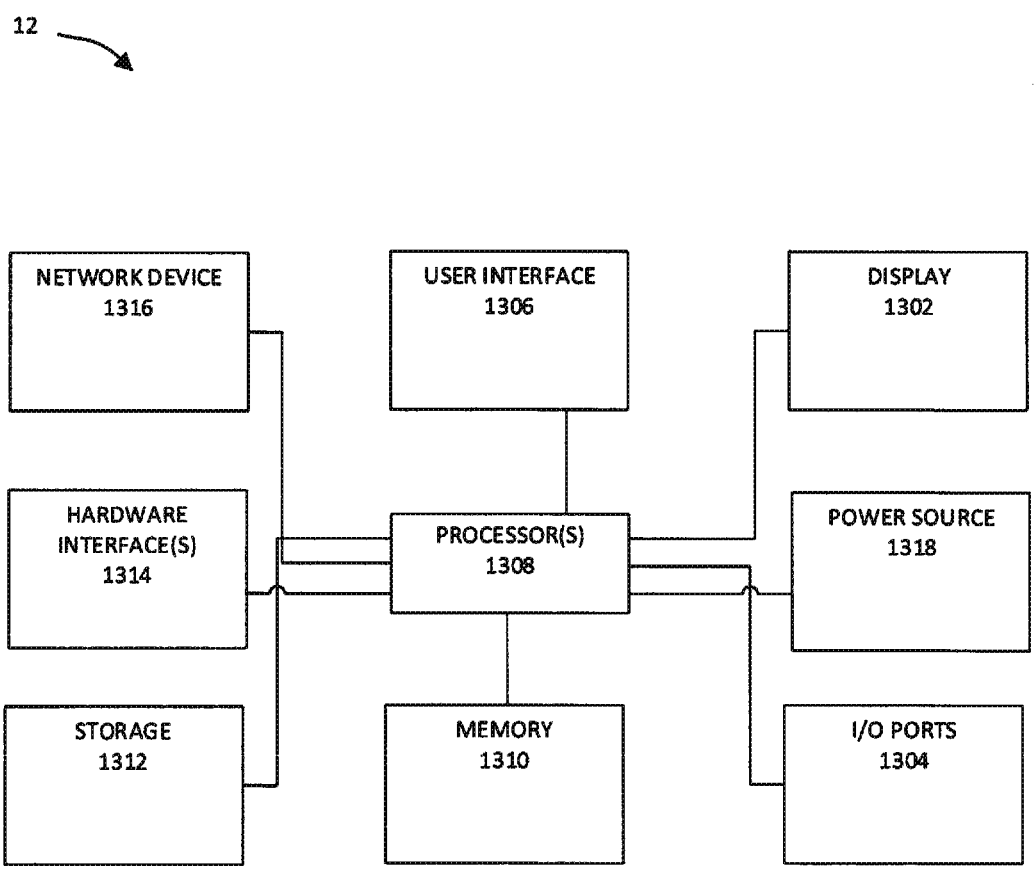
FIG. 13 is a block diagram of components of an illustrative electronic device is shown in accordance with an embodiment of the present disclosure.

FIG. 13 is a block diagram of components of an illustrative electronic device 12 is shown in accordance with an embodiment of the present disclosure. The block diagram includes a display 1302, I/O ports 1304, a user interface 1306, one or more processors 1308, a memory 1310, storage 1312, hardware interface(s) 1314, networking device 1316, and power source 1318.

As discussed herein, in certain embodiments user interface 1306 may be displayed on display 1302, and may provide a means for a user to interact with the electronic device 12. User interface 1306 may be a textual user interface, a graphical user interface (GUI), or any combination thereof. User interface 1306 may, in certain embodiments, allow a user to interface with displayed interface elements via the one or more input devices, e.g., mouse and keyboard, controller, etc., and/or via a touch sensitive implementation of display 1302. In such embodiments, user interface 1306 provides interactive functionality, allowing a user to select, by touch screen or other input structure, from among options displayed on display 1302. Thus, the user can operate electronic device 12 by appropriate interaction with user interface 1306. Further, as described above, user interface 1306 may enable the selection and control of videogames displayed on display 1302, via input devices coupled to I/O ports 1304.

Processor(s) 1308 may provide the processing capability to execute the operating system, programs, videogames, user interface 1306, and any other functions of the electronic device 12. Processor(s) 1308 may include one or more microprocessors, such as one or more "general-purpose" microprocessors, a combination of general and special purpose microprocessors, and/or ASICS. For example, processor(s) 1308 may include one or more reduced instruction set (RISC) processors, such as a RISC processor, as well as graphics processors, video processors, and/or related chip sets.

Embodiments of electronic device 12 may also include memory 1310. Memory 1310 may include a volatile memory, such as RAM, and a non-volatile memory, such as ROM. Memory 1310 may store a variety of information and may be used for a variety of purposes. For example, memory 1310 may store the firmware for electronic device 12, such as an operating system for electronic device 12 and/or any other programs or executable code necessary for electronic device 12 to function. In addition, memory 1310 may be used for buffering or caching during operation of electronic device 12.

Electronic device 12 in FIG. 13 may also include non-volatile storage, such as ROM, flash memory, a hard drive, any other suitable optical, magnetic, or solid-state storage medium, or a combination thereof. Storage 1312 may store data files such as media (e.g., music and video files), software (e.g., for implementing functions on electronic device 12), preference information (e.g., media playback preferences), scene configuration files, wireless connection information (e.g., information that may enable media device to establish a wireless connection such as a telephone connection), subscription information (e.g., information that maintains a record of podcasts or television shows or other media a user subscribes to), telephone information (e.g., telephone numbers), and any other suitable data. Additionally, as described in detail below, storage 1312 may store recorded data from media executed on electronic device 12.

The embodiment in FIG. 13 also includes one or more hardware interfaces 1314. Hardware interfaces 1314 may receive expansion cards that may be used to add functionality to electronic device 12, such as additional memory, I/O functionality, or networking capability. The expansion card may connect to electronic device 12 through any type of connector and may be accessed internally or externally to electronic device 12. For example, in one embodiment the hardware interfaces 1314 may receive a flash memory card, such as a SecureDigital (SD) card, mini- or microSD, CompactFlash card, Multimedia card (MMC), etc. In other embodiments, hardware interfaces 1314 may include ISA, PCI, PCI-X, AGP, PCI-Express, etc. Additionally, in some embodiments, hardware interfaces 1314 may receive a Subscriber Identity Module (SIM) card, for use with an embodiment of electronic device 12 that provides mobile phone capability.

Electronic device 12 depicted in FIG. 13 also includes network device 1316, such as a network controller or a network interface card (NIC). In one embodiment, network device 13 may be a wireless NIC providing wireless connectivity over any 802.11 standard or any other suitable wireless networking standard. Network device 1316 may allow electronic device 12 to communicate over network 13, such as a cellular network, LAN, WAN, CAN, MAN, or the Internet. Further, electronic device 12 may connect to and send or receive data with any device on the network, such as other portable electronic devices, personal computers, printers, etc. Alternatively, in some embodiments the electronic device may not include network device 13. In such an embodiment, a NIC may be added into hardware interfaces 1314 to provide similar networking capability as described above.

Electronic device 12 may also include or be connected to power source 1320. In one embodiment, power source 1320 may be a battery, such as a Li-Ion battery. In such embodiments, the battery may be rechargeable, removable, and/or attached to other components of electronic device 12. Additionally, in certain embodiments power source 1320 may be an external power source, such as a connection to AC power and electronic device 12 may be connected to power source 1320 via one or more of I/O ports 1304.

As described above, a user may use electronic device 12 to play a media. The media may be stored on a tangible computer-readable medium accessible to electronic device 12. The media may be stored on storage 1312, and/or the memory 1310, and may be stored on removable optical media, such as a CD, DVD, etc. During play of a media, a user may make choices, resolve conflicts, solve puzzles, etc. These choices, conflicts, and puzzles, and any related data may be recorded by electronic device 12, so that the user's performance (such as results and metrics) and other data relating to the user's play may be recorded on storage 1312.

Note that in certain example embodiments, the operations outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element may store data used for the operations described herein. This includes the memory element being able to store software, logic, code, or processor instructions that may be executed to carry out the activities described in this Specification. A processor may execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, video playback engine, load scene module, play scene module, complete scene module, playback time event handler module, and/or display decisions module, may include software in order to achieve the conversation management functions outlined herein. These activities may be facilitated by security framework 22. Security framework 22 may include memory elements for storing information to be used in managing a conversation, as outlined herein. Additionally, security framework 22 may include a processor that may execute software or an algorithm to perform management of a conversation, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that system 10 (and its teachings) are readily scalable and may accommodate more complicated/sophisticated arrangements and configurations. Accordingly, the examples provided herein should not limit the scope or inhibit the broad teachings of system 10 as potentially applied to a myriad of other architectures. Additionally, although described with reference to particular scenarios where different modules (e.g., video playback engine, load scene module, play scene module, complete scene module, playback time event handler module, and/or display decisions module) reside in a particular physical location, the modules may reside in any location, provided it has some connectivity to a suitable network.

It is also important to note that the steps discussed with reference to the FIGURES illustrate only some of the possible scenarios that may be executed by, or within, system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in security environments or arrangements, the present disclosure may be used in any online environment that could benefit from such technology. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method for managing a plurality of scenes in a mobile device, comprising:
   providing a composite media file of video with a plurality of scenes and a plurality of events;
   playing a first scene of the media file on a display with at least one event of the plurality of events positioned over the first scene;
   identifying a position of an event of the at least one event, the event being associated with an object in the first scene of the video;
   identifying a progression of playing of the first scene;
   adjusting the position of the event on the display interpolated between a start-frame and an end-frame proportionally based on the progression of the first scene relative to a duration of the first scene and a position of the object;
   identifying when any second scenes associated with the at least one event has been visited;
   responsive to the any second scenes being visited, marking the at least one event associated with the any second scenes;
   determining if the event of the at least one event has been selected while the scene is playing; and
   responsive to the event being selected, taking an action.

2. The method of claim 1, wherein taking the action comprises loading another scene in the plurality of scenes, wherein the other scene is indicated by the event.

3. The method of claim 1, further comprising:
receiving the plurality of scenes;
receiving plurality of events to position on the plurality of scenes;
receiving a request to publish the composite media file with the plurality of scenes and the plurality of events; and
compiling the composite media file to form a program.

4. The method of claim 1, wherein the plurality of scenes are in a plurality of groups associated with a timeline.

5. The method of claim 4, wherein the first scene is in a first group, further comprising:
responsive to taking the action, determining whether the action is to play a second scene in a group that is different from the first scene;
determining whether any scenes from the first group are non-played and flagged; and
responsive to determining that scenes from the first group are non-played and flagged, playing a scene in the first group that is non-played and flagged as the action.

6. An mobile device comprising at least one processor and at least one memory, the at least one memory including computer program instructions that, when executed by the at least one processor, cause the mobile device to:
provide a composite media file of video with a plurality of scenes and a plurality of events;
play a first scene of the media file on a display with at least one event of the plurality of events positioned over the first scene;
identifying a position of an event of the at least one event, the event being associated with an object in the first scene of the video;
identifying a progression of playing of the first scene of the video; and
adjusting the position of the event on the display interpolated between a start-frame and an end-frame proportionally based on the progression of the first scene relative to a duration of the first scene and a position of the object;
identify when any second scenes associated with the at least one event has been visited;
responsive to the any second scenes being visited, mark the at least one event associated with the any second scenes;
determine if the event of the at least one event has been selected while the scene is playing; and
responsive to the event being selected, take an action.

7. The mobile device of claim 6, wherein taking the action comprises loading another scene in the plurality of scenes, wherein the other scene is indicated by the event.

8. The mobile device of claim 6, further comprising instructions, when executed by the at least one processor, cause the mobile device to:
receive the plurality of scenes;
receive plurality of events to position on the plurality of scenes;
receive a request to publish the composite media file with the plurality of scenes and the plurality of events; and
compile the composite media file to form a program.

9. The mobile device of claim 6, wherein the plurality of scenes are in a plurality of groups associated with a timeline.

10. The mobile device of claim 9, wherein the scene is in a first group, further comprising computer program instructions, when executed by the at least one processor, cause the mobile device to:
responsive to taking the action, determine whether the action is to play a second scene in a group that is different from the first scene;
determine whether any scenes from the first group are non-played and flagged; and
responsive to determining that scenes from the first group are non-played and flagged, play a scene in the first group that is non-played and flagged as the action instead of the second scene.

11. A non-transitory computer readable medium comprising instructions that, when executed, cause an apparatus to:
providing a composite media file of video with a plurality of scenes and a plurality of events;
playing a first scene of the media file on a display with at least one event of the plurality of events positioned over the first scene;
identifying a position of an event of the at least one event, the event being associated with an object in the first scene of the video;
identifying a progression of playing of the first scene of the video; and
adjusting the position of the event on the display interpolated between a start-frame and an end-frame proportionally based on the progression of the first scene relative to a duration of the scene and a position of the object;
identifying when any second scenes associated with the at least one event has been visited;
responsive to the any second scenes being visited, marking the at least one event associated with the any second scenes;
determining if the event of the at least one event has been selected while the scene is playing; and
responsive to the event being selected, taking an action.

12. The non-transitory computer readable medium of claim 11, wherein taking the action comprises loading another scene in the plurality of scenes, wherein the other scene is indicated by the event.

13. The non-transitory computer readable medium of claim 11, further comprising instructions that, when executed, cause an apparatus to:
receiving the plurality of scenes;
receiving plurality of events to position on the plurality of scenes;
receiving a request to publish the composite media file with the plurality of scenes and the plurality of events; and
compiling the composite media file to form a program.

14. The non-transitory computer readable medium of claim 11, wherein the plurality of scenes are in a plurality of groups associated with a timeline.

15. The non-transitory computer readable medium of claim 14, wherein the first scene is in a first group, further comprising instructions that, when executed, cause an apparatus to:
responsive to taking the action, determining whether the action is to play a second scene in a group that is different from the first scene;
determining whether any scenes from the first group are non-played and flagged; and
responsive to determining that scenes from the first group are non-played and flagged, playing a scene in the first group that is non-played and flagged as the action.

* * * * *

UNITED STATES PATENT AND TRADEMARK OFFICE
CERTIFICATE OF CORRECTION

| | | |
|---|---|---|
| PATENT NO. | : 8,977,113 B1 | Page 1 of 1 |
| APPLICATION NO. | : 14/063863 | |
| DATED | : March 10, 2015 | |
| INVENTOR(S) | : Rumteen et al. | |

It is certified that error appears in the above-identified patent and that said Letters Patent is hereby corrected as shown below:

Title Page, Item (72) Inventors, should read

-- (72) Inventors: Joseph Rumteen, Porter Ranch, CA (US); Zhobin Napoleon Rumteen, Woodland Hills, CA (US) --.

Signed and Sealed this
Twenty-first Day of June, 2016

Michelle K. Lee
*Director of the United States Patent and Trademark Office*